United States Patent
Park et al.

(10) Patent No.: US 8,559,556 B2
(45) Date of Patent: Oct. 15, 2013

(54) METHOD OF BANDPASS SAMPLING USING SINGLE SIDEBAND CONVERTING

(75) Inventors: Jinwoo Park, Seoul (KR); Chung Gu Kang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 632 days.

(21) Appl. No.: 12/711,012

(22) Filed: Feb. 23, 2010

(65) Prior Publication Data

US 2011/0110471 A1 May 12, 2011

(30) Foreign Application Priority Data

Nov. 10, 2009 (KR) ......................... 10-2009-0108086

(51) Int. Cl.
*H03K 9/00* (2006.01)
(52) U.S. Cl.
USPC ............ 375/316; 375/324; 375/340; 375/350
(58) Field of Classification Search
USPC .................................. 375/316, 324, 340, 350
See application file for complete search history.

(56) References Cited

U.S. PATENT DOCUMENTS

| | | | | |
|---|---|---|---|---|
| 5,187,719 A | * | 2/1993 | Birgenheier et al. | ......... 375/226 |
| 2009/0232246 A1 | * | 9/2009 | Iida | ............................... 375/267 |

OTHER PUBLICATIONS

Translation of Korean Office Action in counterpart Korean patent application; issued Mar. 10, 2011.
Bae, Ha, and Park, "Complex Sampling Technique and its Generalized Formulae for SDR Systems," Korea Information and Communications Society, Jul. 2005, 7C of vol. 30, pp. 687-695.

* cited by examiner

*Primary Examiner* — Kabir A Timory
(74) *Attorney, Agent, or Firm* — John L DeAngelis; Beusse Walter Sanks Mora & Maire, P.A.

(57) ABSTRACT

The present invention provides a method of bandpass sampling which particularly includes the single-sideband signal conversion procedure prior to the sampling process in the purpose of lowering the required sampling frequency. Conversion of the bandpass RF signal into a single-sideband spectrum signal which has the spectrum components only in either the positive or the negative frequency domain is accomplished by bandpass-filtering, or more effectively by using a Hilbert transformer. This invention includes a method of finding the minimum sampling frequency for simultaneous frequency down-conversion of multiple RF bandpass signals. It is expected from this invention that the components additionally required in the RF receiver due to the proposed bandpass sampling method is the bandpass filters or the Hilbert transformer for single-sideband conversion, but the benefits from this invention could be the reduced ADC speed performance and the subsequent digital processing load in the receiver system because of the reduced data rates.

8 Claims, 4 Drawing Sheets

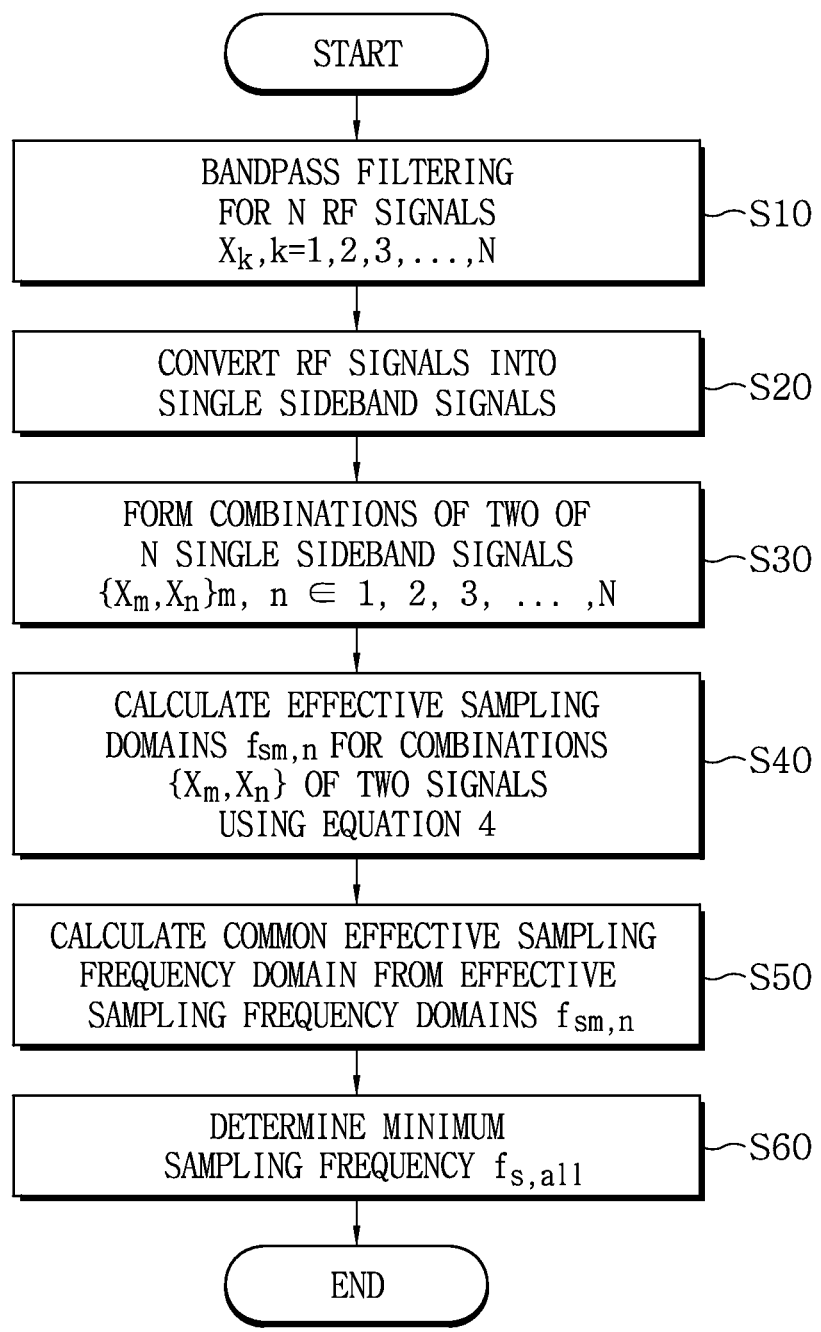

METHOD OF BANDPASS SAMPLING USING SINGLE SIDEBAND CONVERTING

BACKGROUND OF THE INVENTION

1. Field of the Invention

The present invention relates to a method of bandpass sampling using single sideband conversion, and more particularly, to a method of bandpass sampling using single sideband conversion which is capable of improving an efficiency of bandpass sampling by performing a bandpass sampling after converting a double-sideband RF signal to a single-sideband signal in the bandpass sampling process which down-converts the RF signal to a baseband in the frequency domain, which is obtained by removing either upper-sideband or lower-sideband spectrum from a double-sideband spectrum of an RF signal.

2. Description of the Related Art

With current mixture of various wireless communication schemes, researches for a terminal structure which can accommodate multi standards have been in progress. Among other things, a software defined radio (SDR) technique which can reconfigure the entire function of a wireless communication system by reconfiguration of software based on a highly advanced digital signal processing technique. Such SDR can allow to accommodate multiple wireless communication standards in an integrated fashion as a single transmission/receipt system platform by only changing appropriate software modules. Such an SDR technique is standing out as a core terminal technique covering the forthcoming wireless techniques.

An RF hardware platform like in the SDR technique that is designed to handle multiple RF standards together requires a processing capability over a wideband frequency band. However, development and module implementation of the related RF devices having such a wideband frequency characteristic needs to be developed further to satisfy the actual practicability in technical and economical terms. Accordingly, the methods of converting and processing wideband RF signals using advanced signal processing techniques have emerged recently, one of which is the software-based bandpass sampling scheme which down-converts an RF signal into a baseband signal.

A bandpass sampling scheme is a method of shifting a frequency of a modulated bandpass signal by sub-sampling the modulated signal, thereby allowing a lower sampling frequency to be utilized.

FIG. 1 shows an example process of frequency down-conversion of one RF signal in a conventional bandpass sampling technique.

As shown in the figure, a signal input through a wideband antenna 10 is amplified by a wideband low noise amplifier (LNA) 11 and then a signal having a desired RF band is extracted from the amplified signal by bandpass filter 12. An analog-digital converter (ADC) 13 converts an analog signal into a digital signal which is then processed by a subsequent digital signal processor (DSP) 14 for restoration of the originally-transmitted signal.

In addition to the conversion of the analog signal into the digital signal, the ADC 13 performs a frequency down-conversion for converting the RF band signal into a signal at a low frequency band close to DC through the bandpass sampling. This allows a RF bandpass signal to be converted into a baseband signal using a sampling frequency lower than one which can be obtained according to a Nyquist sampling theorem. Accordingly, conventional complicated RF signal processing parts which were used for frequency down-conversion of RF signals can be omitted and a sampling frequency required for ADC can be lowered, thereby a processing burden of a digital processor and a cost can be reduced.

An RF signal consists of an upper sideband spectrum and a lower sideband spectrum, both of which in fact contain the same information. Since the sampling frequency of the bandpass sampling used in frequency down-converting of an RF signal is lower than the Nyquist sampling frequency, a very careful exercise in the sampling should be performed so that the wanted RF signal spectrum is shifted to the predetermined low-frequency baseband while completely avoiding overlapping with any other spectrum that could also be shifted by down-converting bandpass sampling. In particular, if multiple RF signals are to be frequency down-converted simultaneously through one bandpass sampling process, there is much higher possibility of spectrum overlapping with one another in the down-converted baseband. Accordingly, a more strict bandpass sampling process is required for the frequency down-conversion process.

Since a higher sampling frequency is required for bandpass sampling of multiple RF signals, there is a need of a more efficient bandpass sampling method which is capable of lowering the bandpass sampling frequency leading to a reduced burden to ADC performance as well as a reduced processing load to the subsequent signal processing processes.

SUMMARY OF THE INVENTION

Accordingly, it is an object of the present invention to provide a bandpass sampling method using a single sideband conversion, which is capable of alleviating a frequency overlap problem in down-conversion and lowering a high sampling frequency in conventional bandpass sampling methods in order to increase a signal processing efficiency by converting multiple RF bandpass signals into signals having a single sideband spectrum obtained by removing either upper or lower sideband spectrum of the RF bandpass signals before sampling the multiple RF bandpass signals.

It is another object of the present invention to provide a bandpass sampling method using a single sideband conversion, which is capable of alleviating a burden of a digital signal processing for wideband signals by transforming multiple RF bandpass signals into single sideband signals using a Hilbert transformer before being bandpass sampled, and performing a bandpass sampling process of converting the single sideband signals into baseband signals simultaneously.

It is still another object of the present invention to provide a bandpass sampling method using a single sideband conversion, which is capable of easily obtaining a low sampling frequency for multiple RF bandpass signals by converting the multiple RF bandpass signals into single sideband signals, obtaining effective sampling frequency domains by combining two of the converted single sideband signals, obtaining a common effective sampling frequency domain, and determining the minimum sampling frequency in the common effective sampling frequency domain.

To achieve the above-mentioned objects, according to an aspect of the invention, there is provided a bandpass sampling method of an analog RF signal receiving system which receives an analog RF signal and converts the analog RF signal into a digital signal by bandpass sampling with a single sideband signal conversion, including: a bandpass filtering step of selecting one or more analog RF signal of a desired frequency band; a converting step of converting the bandpass filtered signals into complex signals which contain only a single-sideband spectrum by removing either negative or a positive frequency components in the frequency domain; and a bandpass sampling step of bandpass sampling the complex signals with a lower sampling frequency that can down-convert RF bandpass signals to baseband signal.

Preferably, the bandpass sampling step includes a step of selecting the minimum frequency of a common region of the obtained one or more effective sampling frequency domains as a sampling frequency and performing bandpass sampling with the selected sampling frequency.

Preferably, the bandpass sampling step includes a step of configuring the filtered signal obtained in the bandpass filtering step as an I channel signal and configuring the complex signals obtained in the converting step as a Q channel signal to form a complex single sideband signal I(t)+jQ(t) with no spectrum in a negative frequency domain.

Preferably, the bandpass filtering step includes a step of using a plurality of bandpass filters to filter a desired frequency band of the one or more analog RF signal.

Preferably, the sampling step includes: a step of configuring all combinations of two signals from the two or more complex single sideband signals; a step of obtaining effective sampling frequency domains for the configured signal combinations and obtaining a common effective sampling frequency domain which is common to the obtained effective sampling frequency domains; and a step of selecting the minimum frequency in the obtained common effective sampling frequency domain as a sampling frequency.

ADVANTAGES OF THE INVENTION

According to one aspect of the invention, the bandpass sampling method using a single sideband conversion provides an advantage of alleviating a frequency overlap problem in down-conversion and lowering a high sampling frequency by converting multiple RF bandpass signals into signals having a single sideband spectrum obtained by removing either upper or lower sideband spectrum of the RF bandpass signals before sampling the multiple RF bandpass signals, which results in lowering the required ADC performance and hence decrease in costs for ADC design and related parts, and processing for various kinds of signals at a lower digital data rate.

According to another aspect of the invention, the bandpass sampling method using a single sideband conversion provides an advantage of alleviating a burden of a digital signal processing for wideband signals with an additional simple configuration by transforming multiple RF bandpass signals into single sideband signals using a Hilbert transformer before being bandpass sampled, and performing a bandpass sampling process of converting the single sideband signals into baseband signals simultaneously.

According to still another aspect of the invention, the bandpass sampling method using a single sideband conversion provides an advantage of easily obtaining a low sampling frequency for multiple RF bandpass signals by converting the multiple RF bandpass signals into single sideband signals, obtaining effective sampling frequency domains for combinations of two single sideband signals, obtaining a common effective sampling frequency domain, and determining the minimum sampling frequency in the common effective sampling frequency domain.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIG. 9 is a flow chart showing a bandpass sampling process according to an embodiment of the present invention.

DETAILED DESCRIPTION OF THE PREFERRED EMBODIMENT

Hereinafter, preferred embodiments of the present invention will be described in detail with the accompanying drawings.

Figure 1:
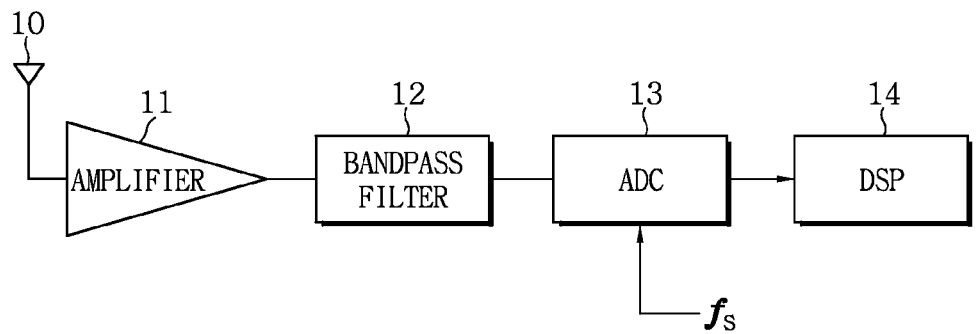
FIG. 1 shows a conventional example bandpass sampling system structure which down-converts a single RF signal.
Figure 2:
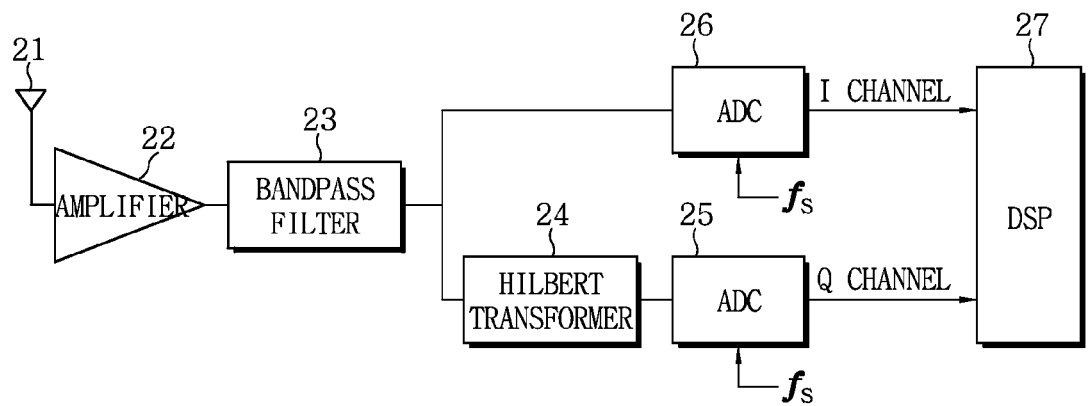
FIG. 2 shows a bandpass sampling system configuration according to an embodiment of the present invention.

FIG. 2 shows a structure of a system which performs bandpass sampling for one RF signal after being converted into a single sideband signal. An RF signal input through a wideband antenna 21 is amplified by a wideband low noise amplifier (LNA) 22 and then only a signal having a desired RF band is extracted from the amplified signal and signals having different RF bands are removed from the amplified signal by a bandpass filter 23. In FIG. 2, the bandpass filtered signal is separated into two signals, one being directly applied to an ADC 26 to form an I(t) channel signal and the other being applied to an ADC 25 through a Hilbert transformer 24 to form a Q(t) channel signal. After the Q(t) channel signal is made to be a complex signal, the I(t) channel signal and the complex Q(t) channel signal are summed to give a final complex signal I(t)+jQ(t).

The complex signal I(t)+jQ(t) becomes an analytic signal having no spectrum in a negative frequency domain. The complex Q(t) channel signal may be expressed as follows.

$$Q(t) = I(t) * \frac{1}{\pi t} \qquad \text{[Equation 1]}$$

Where, a symbol * represents a convolution operation, which means that an impulse response function of the Hilbert transformer 24 is $1/\pi t$.

In other words, the signal Hilbert-transformed by the Hilbert transformer 24 has a complex function and is summed with the non-Hilbert-transformed signal to form a single sideband signal (I(t)+jQ(t)). The Hilbert transformer 24 and the ADC 25 and 26 may be implemented by hardware separately from a DSP 27 or, in some cases, may be integrated with the DSP 27. When a software configuration is more widened in the future, even the shown bandpass filter 23 could be implemented by software.

Figure 3:
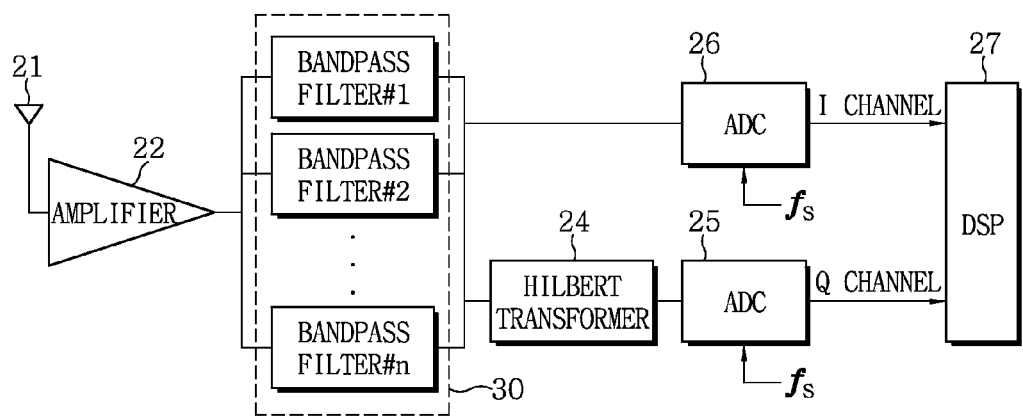
FIG. 3 shows a bandpass sampling system configuration for multiple RF signals according to an embodiment of the present invention.

FIG. 3 shows a bandpass sampling system configuration for frequency down-converting N RF signals simultaneously. This configuration for frequency down-converting N RF signals simultaneously employs N different carrier frequencies allocated according to different communication standards and N bandpass filters 30 fitting to bandwidths of signal carried on the respective carrier frequencies. The remaining configurations are similar to those shown in FIG. 2.

That is, even in the case of the configuration for frequency down-converting N RF signals simultaneously, an additional component to the basic configuration is only the Hilbert transformer 24, giving insignificant increase in the entire hardware configuration. The related cost increase could be low as compared to the advantages caused by the lowered sampling frequency in frequency down-conversion, which will be described later.

Figure 4:
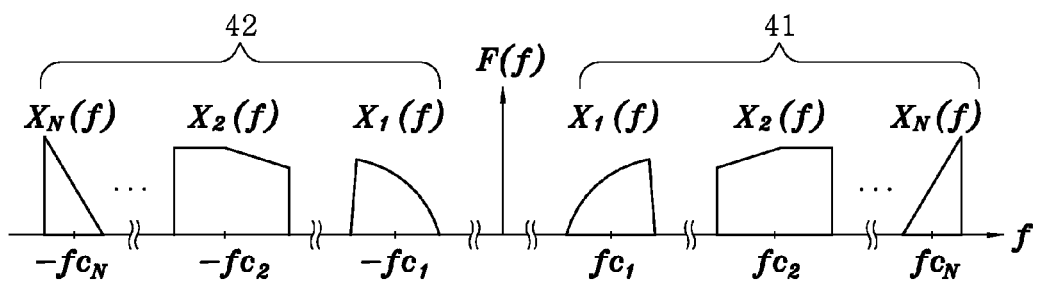
FIG. 4 shows an example spectrum distribution in a frequency domain of N RF signals.

FIG. 4 shows an example spectrum distribution where N signal are arranged on N carrier frequencies in a frequency domain. More specifically, FIG. 4 shows a typical form of multiple RF signals where N bandpassed signal $X_k(f)$ (k=1, 2, ..., N) are arranged on respective different carrier frequencies $f_{ck}$ (k=1, 2, ..., N) in a non-overlapping manner). At this time, the signal arrangement a symmetrical form 41 and 42 in a double sideband.

Figure 5:
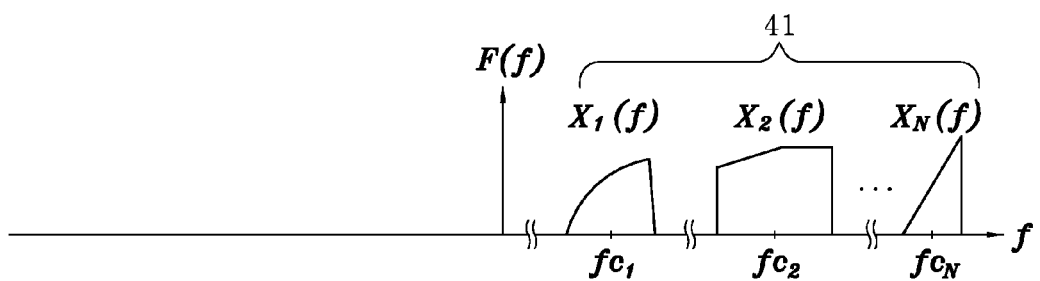
FIG. 5 shows a spectrum distribution with only positive frequency domain components as a result of single sideband conversion for the signals shown in FIG. 4.

FIG. 5 shows a spectrum distribution 41 without components 42 of a negative frequency domain component, which is obtained when the I(t) channel signal and the Q(t) channel signal formed by the inserted Hilbert transformer 24 in FIG. 3 are summed in the DSP 27. This embodiment addresses a method of achieving bandpass sampling by sub-sampling a signal whose spectrum exists in only one negative or positive frequency domain with the other negative or positive frequency domain removed as shown in FIG. 5.

Figure 6:
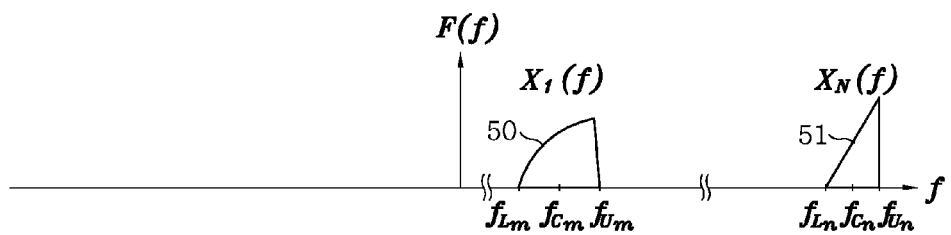
FIG. 6 shows a spectrum distribution of two RF band signals.

FIG. 6 shows parameters set to represent an RF spectrum signal for the purpose of deriving a process of obtaining an effective sampling region. In this figure, two signal spectrums 50 and 51 separated from each other are used for the purpose of simplicity of description.

$X_m(f)$ 50 represents a spectrum of a signal $X_m(t)$ and $X_n(f)$ 51 represents a spectrum of a signal $X_n(t)$. $f_{Lm}$ and $f_{Um}$ represent a lower limit frequency and an upper limit frequency of the signal $X_m(t)$, respectively. $f_{Ln}$ and $f_{Un}$ represent a lower limit frequency and an upper limit frequency of the signal $X_n(t)$, respectively. $BW_m$ (=$f_{Um}$-$f_{Lm}$) represents a bandwidth of the signal $X_m(t)$ and $BW_n$ (=$f_{Un}$-$f_{Ln}$) represents a bandwidth of the signal $X_n(t)$. A parameter fs related to the bandpass sampling represents a sampling frequency. Here, the upper limit frequency $f_{Uk}$=$f_{Ck}$+($BW_k$/2) and the lower limit frequency $f_{Lk}$=$f_{Ck}$-($BW_k$/2).

Figure 7:
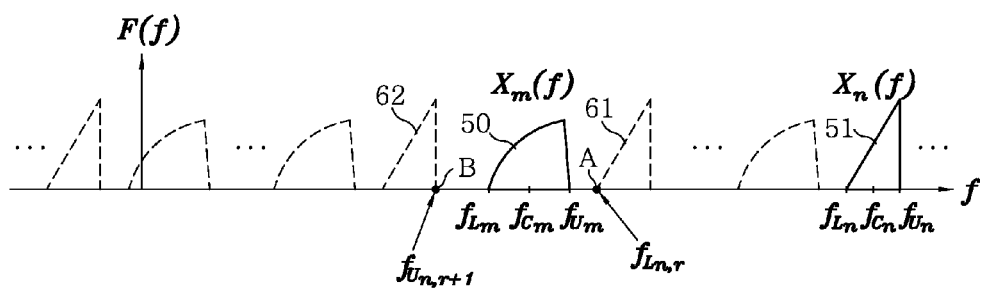
FIG. 7 shows an example frequency down-converted signal spectrum distribution obtained when two RF signals of FIG. 6 are subjected to bandpass sampling.

FIG. 7 shows an example spectrum distribution where two spectrum signals which are frequency down-converted by the bandpass sampling in FIG. 5 do not overlap with each other. To this end, an effective sampling frequency has to satisfy the following two constraints. First, as a constraint on an upper value of a sampling frequency, $f_{Ln,r}$(A) of a signal 61 obtained by left shifting $X_n(f)$ 51 to $(r_{m,n})^{th}$ by the bandpass sampling has to be larger than $f_{Um}$ of $X_m(f)$ 50 of a different RF signal. Second, as a constraint on a lower value of a sampling frequency, $f_{Un,r+1}$ (B) of a signal 62 obtained by left shifting $X_n(f)$ 51 of an RF signal to $(r_{m,n}+1)^{th}$ has to be smaller than $f_{Um}$ of the RF signal $X_m(f)$ 50. These two constraints may be expressed by the following equations, respectively.

$$f_{C_n} - \frac{BW_n}{2} - r_{m,n}f_s \geq f_{C_m} + \frac{BW_m}{2} \quad \text{[Equation 2]}$$

$$f_{C_n} + \frac{BW_n}{2} - (r_{m,n}+1)f_s \leq f_{C_m} - \frac{BW_m}{2} \quad \text{[Equation 3]}$$

The above two equations may be added to give the following equation.

$$\frac{f_{C_{n-m}} + (BW_{m+n}/2)}{r_{m,n}+1} \leq f_{S_{m,n}} \leq \frac{f_{C_{n-m}} - (BW_{m+n}/2)}{r_{m,n}} \quad \text{[Equation 4]}$$

Where, $f_{C_{n-m}}$=$f_{Cn}$-$f_{Cm}$, $BW_{m+n}$=$BW_m$+$BW_n$, and $r_{m,n}$ is an integer which is defined by the following range.

$$0 \leq r_{m,n} \leq \left\lfloor \frac{f_{C_{n-m}} - (BW_{m+n}/2)}{BW_{m+n}} \right\rfloor \quad \text{[Equation 5]}$$

An effective sampling frequency range for bandpass sampling of the two RF spectrum signals $X_m(f)$ and $X_n(f)$ can be obtained from Equation 4. That is, since the minimum sampling frequency corresponds to the largest value of the parameter in the denominator of the left term of Equation 4, Equation 4 may be arranged as follows.

$$f_{S_{m,n\_min}} = \frac{f_{C_{n-m}} + (BW_{m+n}/2)}{\left\lfloor \frac{f_{C_{n-m}} - (BW_{m+n}/2)}{BW_{m+n}} \right\rfloor + 1} \quad \text{[Equation 6]}$$

Figure 8:
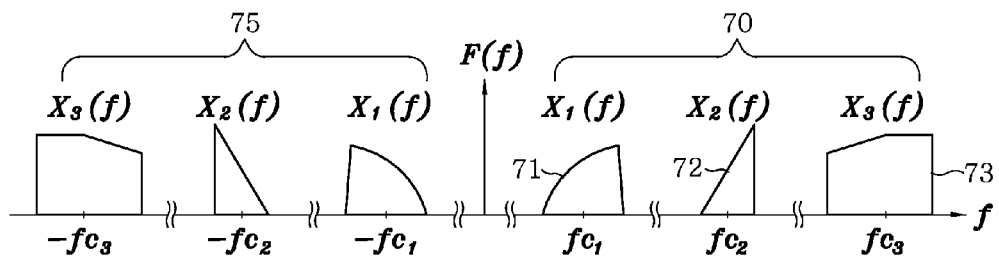
FIG. 8 shows a spectrum distribution of three RF signals.

FIG. 8 shows a spectrum distribution of three bandpass RF signals. A method of obtaining an effective sampling region required in a process of frequency down-converting the three RF signals simultaneously will be described below. When signals 70 and 75 in negative and positive frequency domains as shown in FIG. 8 are passed through the configuration described with reference to FIG. 3, signals in only one of the negative and positive frequency domains are left. When combinations of two among such three RF signal components are set and Equation 3 is applied thereto, it is possible to obtain effective sampling frequency range for two signal components, i.e., a sampling frequency range $f_{S1,2}$ for $X_1(f)$ 71 and $X_2(f)$ 72, a sampling frequency range $f_{S1,2}$ for $X_1(f)$ 71 and $X_3(f)$ 73, and a sampling frequency range $f_{S2,3}$ for $X_2(f)$ 72 and $X_2(f)$ 73. A frequency range corresponding to a common overlapping portion of the three frequency regions obtained thus is an effective sampling frequency range. This may be expressed by the following equation.

$$f_{S,three} = f_{S1,2} \cap f_{S1,3} \cap f_{S2,3} \quad \text{[Equation 7]}$$

Where, a symbol ∩ represents an intersection which means a common portion of two domains. In addition, the minimum value which can be obtained within the effective sampling frequency range obtained in the above process is the minimum sampling frequency which may be expressed by the following equation.

$$f_{S,three,min} = \min\{f_{S,three}\} \quad \text{[Equation 8]}$$

The above process may be expanded to N RF signals for generalization. A generalized effective sampling frequency range for N RF signals can be expressed by the following equation.

$$f_{S,all} = f_{S\_1} \cap f_{S\_2} \cap f_{S\_3} \cap \ldots \cap f_{S\_N-1} \qquad \text{[Equation 9]}$$

In this equation, $$f_{S\_1} = f_{S_{1,2}} \cap f_{S_{1,3}} \cap f_{S_{1,4}} \cap \ldots \cap f_{S_{1,N}}$$

$$f_{S\_2} = f_{S_{2,3}} \cap f_{S_{2,4}} \cap f_{S_{2,5}} \cap \ldots \cap f_{S_{2,N}}$$

$$f_{S\_3} = f_{S_{3,4}} \cap f_{S_{3,5}} \cap f_{S_{3,6}} \cap \ldots \cap f_{S_{3,N}}$$

$$\vdots$$

$$f_{S\_N-1} = f_{S_{N-1,N}}$$

In other words, when sampling frequency ranges for all combinable pairs of two RF signals of N spectrum signals are obtained using Equation 4 and then a common overlapping portion of these sampling frequency ranges is obtained as shown in FIG. 9, this portion is just an effective sampling frequency domain for N signals. In this case, the minimum value, i.e., $f_{S,min} = \min\{f_{S,all}\}$, in the effective sampling frequency range is the minimum sampling frequency.

FIG. 9 is a flow chart showing a process of determining the above-mentioned minimum sampling frequency. As shown, RF signals passed through a wideband antenna and a low noise amplifier are bandpass-filtered into N RF signals through N bandpass filters (S10).

The filtered N RF signals are directly provided to one ADC to form an I channel signal, and at the same time, are transformed into a complex signal using a Hilbert transformer (or a corresponding different kind of transformer or its variant) and then provided to another ADC to form a Q channel signal, both of which are summed to form a single sideband signal I(t)+jQ(t) (S20).

All combinations of two of N signals in the single sideband with an overlap permitted are obtained (S30).

Effective sampling frequency ranges are calculated for the obtained combinations using Equation 4 (S40).

A common effective sampling frequency range is calculated from the effective sampling frequency ranges for the obtained combinations (S50).

The smallest frequency in the obtained common effective sampling frequency range is determined to be the minimum sampling frequency (S60).

The above-described embodiments addressed the configuration and a method which are capable of significantly lowering a sampling frequency using a bandpass sampling technique, required for a software defined radio (SDR) system and the like. This can be employed for most cases where N wireless communication standards are simultaneously received by one radio device and are down-converted into baseband signals to extract a desired signal.

Even if a sampling frequency even lower than a Nyquist sampling rate is selected when N signals are simultaneously down-converted, the use of the above-described embodiments enables a signal processing at an intermediate frequency (IF) stage without any aliasing which is a distortion due to signal overlapping. In addition, since the complex bandpass sampling scheme of the embodiments of the present invention can obtain a wider and more flexible effective sampling region and even lower minimum sampling rate than those in conventional real number bandpass sampling schemes, which results in lowering of required ADC performance and hence decrease in costs, and data processing at a lower digital data rate and hence reduction of signal processing burden and provision of a margin for a variety of signal processing.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A bandpass sampling method of an analog RF signal receiving system which receives an analog RF signal and converts the analog RF signal into a digital signal by bandpass sampling with a single-sideband signal conversion, comprising:
   a bandpass filtering step of selecting one or more analog RF signal of a desired frequency band;
   a converting step of converting the bandpass-filtered signals into complex signals which contain only a single-sideband spectrum by removing either negative or a positive frequency components in a frequency domain; and
   a bandpass sampling step of bandpass sampling the complex signals with a lower sampling frequency that can down-convert RF bandpass signals to baseband signal, and further configuring the filtered signal obtained in the bandpass filtering step as an I channel signal and configuring the complex signals obtained in the converting step as a Q channel signal to form a complex single sideband signal I(t)+jQ(t) which has only either the positive or the negative frequency components, wherein the signal Q(t) is expressed by the following equation:

$$Q(t) = I(t) * \frac{1}{\pi t}$$

where, a symbol * represents a convolution operation, 1/pt represents an impulse response function of a converter applied in the converting step and t represents a time variable.

2. The bandpass sampling method according to claim 1, wherein the bandpass sampling step includes a step of selecting the minimum frequency of a common region of the obtained one or more effective sampling frequency domains as a sampling frequency and performing bandpass sampling with the selected sampling frequency.

3. The bandpass sampling method according to claim 1, wherein conversion of a double-sideband RF signals into the single-sideband spectrum signal is obtained via utilizing the RF bandpass filters that can reject one sideband spectrum leaving the other sideband spectrum.

4. The bandpass sampling method according to claim 3, wherein the conversion step to a single sideband spectrum signal is achieved by using the Hilbert transformer.

5. The bandpass sampling method according to claim 1, wherein the sampling step includes:
   a step of configuring all combinations of two signal pairs from the two or more complex single sideband signals;
   a step of obtaining the effective sampling frequency ranges for the configured signal combinations and obtaining a common effective sampling frequency region which is common to the obtained effective sampling frequency ranges; and
   a step of selecting the minimum frequency in the obtained common effective sampling frequency range as a sampling frequency.

6. The bandpass sampling method according to claim 5, wherein the effective sampling frequency domains for the two signals are obtained according to the following equation:

$$\frac{f_{C_{n-m}} + (BW_{m+n}/2)}{r_{m,n} + 1} \leq f_{S_{m,n}} \leq \frac{f_{C_{n-m}} - (BW_{m+n}/2)}{r_{m,n}}$$

where, $f_c$ represents a signal center frequency, BW represents a signal bandwidth, $r_{m,n}$ represents the number of times of shifts of a signal spectrum for bandpass sampling, $f_{Cn-m} = f_{Cn} - f_{Cm}$, $BW_{m+n} = BW_m + BW_n$, m represents a variable integer number and n represents a variable integer number.

7. The bandpass sampling method according to claim 6, wherein $r_{m,n}$ satisfies the following equation:

$$0 \leq r_{m,n} \leq \left\lfloor \frac{f_{C_{n-m}} - (BW_{m+n}/2)}{BW_{m+n}} \right\rfloor.$$

8. The bandpass sampling method according to claim 5, wherein the minimum value in the effective sampling frequency domains for the two signals is obtained according to the following equation:

$$f_{S_{m,n\_min}} = \frac{f_{C_{n-m}} + (BW_{m+n}/2)}{\left\lfloor \frac{f_{C_{n-m}} - (BW_{m+n}/2)}{BW_{m+n}} \right\rfloor + 1}$$

where, $f_s$ represents a sampling frequency, $f_c$ represents a signal center frequency, BW represents a signal bandwidth, $r_{m,n}$ represents the number of times of shifts of a signal spectrum for bandpass sampling, $f_{Cn-m} = f_{Cn} - f_{Cm}$, $BW_{m+n} = BW_m + BW_n$, m represents a variable integer number and n represents a variable integer number.

* * * * *